United States Patent [19]

Rivacoba

[11] 4,305,787

[45] Dec. 15, 1981

[54] STORAGE RACK FOR SPENT RADIOACTIVE FUEL

[76] Inventor: José U. Rivacoba, Euskalduna 7, Bilbao, Spain

[21] Appl. No.: 87,941

[22] Filed: Oct. 25, 1979

[30] Foreign Application Priority Data

Oct. 25, 1978 [ES] Spain .................................. 474.508
May 18, 1979 [ES] Spain .................................. 480.713

[51] Int. Cl.³ ............................................ G21C 19/20
[52] U.S. Cl. .................................... 376/272; 250/506
[58] Field of Search ................. 176/30; 250/506, 507

[56] References Cited

U.S. PATENT DOCUMENTS 4,063,999 12/1977 Wade .................................. 250/507
4,143,277 3/1979 Krieger .............................. 250/507

Primary Examiner—Donald P. Walsh
Attorney, Agent, or Firm—Wigman & Cohen

[57] ABSTRACT

A rack for storing spent radioactive fuel is disclosed in which a set of cells, consisting of self-supporting metal tubes arranged in a staggered fashion with respect to each other, and joined to each other along their longitudinal edges, forms a rigid spatial structure. The tubular hole defined by each of four tubes has a larger cross-sectional area than said tubes and is provided with neutron-absorbing material. This material is independent of the tubes and may be removed and re-inserted in the tubular hole as often as necessary. Various tubular structures are also disclosed.

14 Claims, 16 Drawing Figures

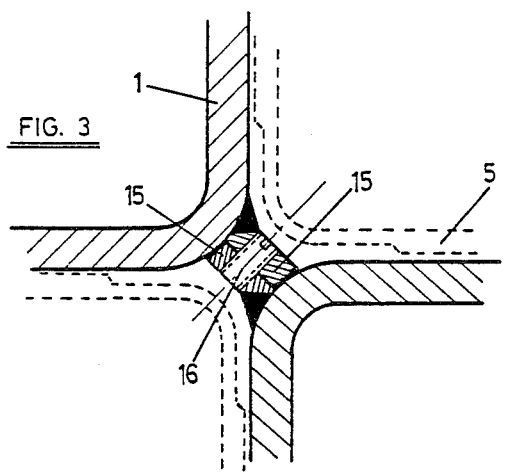
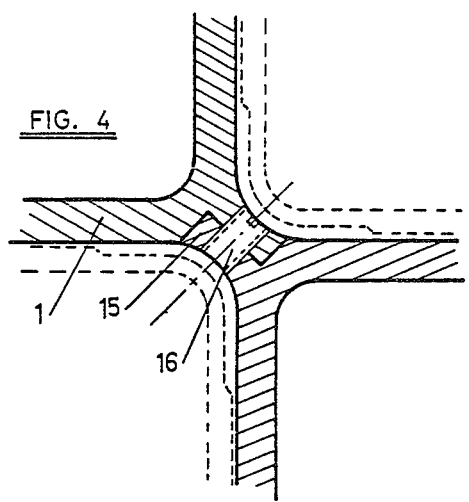
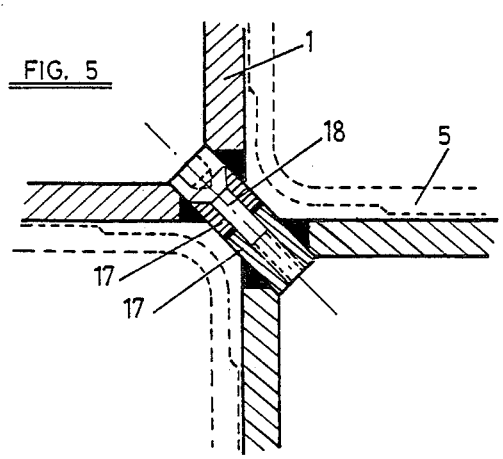

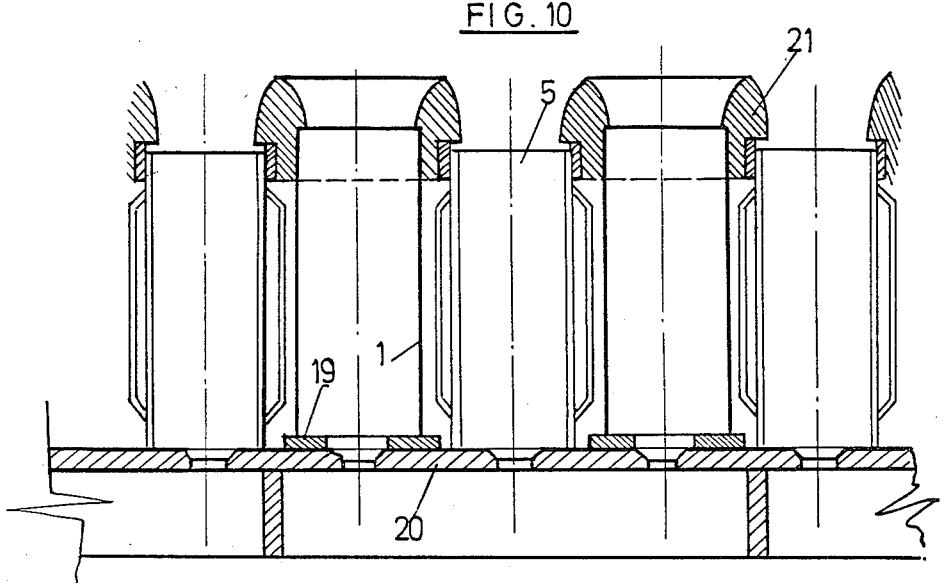
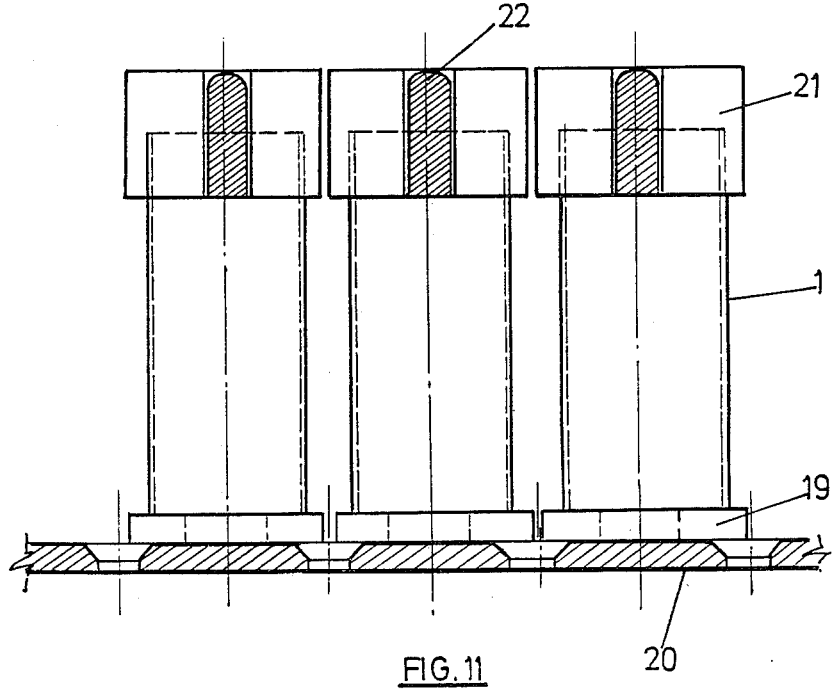

STORAGE RACK FOR SPENT RADIOACTIVE FUEL

BACKGROUND OF THE INVENTION

This invention pertains to racks for storing spent radioactive fuel.

Such racks usually consist of a series of parallel cells whose walls are provided with a protective covering, generally on their inner side, based on a material capable of absorbing neutrons, such as for example, boron. The various cells are assembled by means of end structures or plates.

Racks of this type have as their principal drawbacks their high cost, which is due primarily to the large quantity of protective material required to cover all the cells, and also the complex cell construction process and the assemblage of the entire unit.

A further drawback of these racks lies in their high weight, due to the double wall of each cell.

BRIEF SUMMARY AND OBJECTS OF THE INVENTION

The object of this invention is to achieve a rack of much lower cost and weight than the traditional racks. This is accomplished by reducing the quantity of covering material and by simplifying the construction and assemblage of the entire unit.

In accordance with the present invention, the set of cells consists of self-supporting metal tubes arranged in a staggered fashion with respect to each other and joined to each other along their longitudinal edges so as to form a rigid spatial structure.

The tubular hole delimited by each four tubes has a larger cross-sectional area than the tubes themselves and is intended to receive the protection of neutron-absorbing material, while the tubes themselves are not provided with such protection. In addition, the protection provided in the tubular space delimited within each four tubes is independent of said tubes, so that it may be removed and inserted in the tubular holes as often as necessary.

Each tube may consist of a single extruded piece or of two or more pieces welded together along their edges.

Furthermore, in order to permit the tubes to be joined to each other, each tube may be provided along at least two of its edges with an equal number of longitudinal external projections, the longitudinal outer edge of each tube may be provided along each of its four edges with an external longitudinal projection at an angle of approximately 45°, the longitudinal outer edges of the projections closest to each other of adjacent tubes being joined to each other.

In the first case, wherein each tube has two longitudinal projections, the longitudinal outer edge of each such projection may be joined to the nearest edge of the adjacent tube that lacks such a projection, or the projections of each two adjacent tubes may be placed against each other and the longitudinal outer edges of the abutting projections joined to each other.

The tubular sections are joined to a base plate which has adjustable supports, at least some of which are provided with metal springs, intended to take up irregularities in the ground upon which the assembly rests.

The construction described above greatly reduces the quantity of protective material required, since only the tubular holes defined by each four tubes are provided with the protective covering. Nevertheless, the spent radioactive fuel placed in the tubular sections will also be protected, since each tubular section is surrounded by four tubular holes provided with protective covering. In addition, the weight of the assembly may be reduced even further by providing openings in the walls of the tubes.

Since all the tubes are rigidly connected among themselves, the use of the frames required to support the assembly in the traditional containers is obviated.

However, this rigidity may, under some circumstances, be considered a drawback, because it reduces the safety of the rack when subjected to severe stress, such as, an earthquake, in which case the rigidity of the rack may give rise to a strong dynamic effect requiring the use of thicker plate and stronger welding beads in comparison with other racks having a longer period of vibration.

To avoid this possible drawback, a second approach is provided whereby the tubes are arranged so as to be independent of each other throughout their length. Each tube has mounted at its top a frame between which and the said tube are arranged in discrete regions, adjustable devices that permit centering the element bearing the encapsulated neutron-absorbing material and eliminating the gap that may be present between the upper portion of the bearing element and the surrounding tubes.

These frames may be independent of each other, in which case the rack assembly constitutes a spatial structure of multiple elastic pillars capable of withstanding earthquakes.

The frames may also together comprise a unitary grid running through the entire assembly, so that the rack then forms a spatial structure of multiple elastic supports.

The adjustable devices provided between each frame and tube may, for example, consist of two plates provided with surfaces facing each other in wedge-like fashion. These plates are inserted back-to-back with respect to each other along said surfaces, so as to lie between each tube and the frame of each element bearing the encapsulated neutron-absorbing material. The plates are provided with an upper elbow toward the tube side, in order to provide mutual support between the elbows and the outer edge of the tube. Adjustable support elements are provided between the elbows of both plates in order to permit adjustment of the distance between the elbows; the frame of each tube also being provided with top elements in order to limit the vertical displacement of the plates.

The support elements may consist of vertical bolts threaded on the elbow of the plate located beside the tube with the elbow of the other plate resting upon said bolts.

In the same fashion, the top elements may consist of vertical through bolts threaded in the frame of each tube starting on the upper surface thereof, said screws extending downward beyond the frame so as to rest on the elbow of the plate located on the side of the element bearing the encapsulated neutron-absorbing material.

Regardless of which of these approaches is adopted, the reduced quantity of protective material entails a reduction in the weight of the rack and especially a reduction in the cost thereof, due to the high price of the protective materials used.

BRIEF DESCRIPTION OF THE DRAWINGS

In order to furnish a better understanding of the construction and characteristics of the racks built in accordance with the present invention, they are described in greater detail below with reference to the attached drawings which show possible embodiments of the invention as non-restrictive examples and wherein:

FIGS. 2 through 7 are views similar to FIG. 1, showing variants of the construction and form of connection of the tubular elements to each other;

FIG. 10 is a section along line X—X of FIG. 9;

FIG. 11 is a section along XI—XI of FIG. 9;

DETAILED DESCRIPTION OF THE PREFERRED EMBODIMENTS

Figure 1:
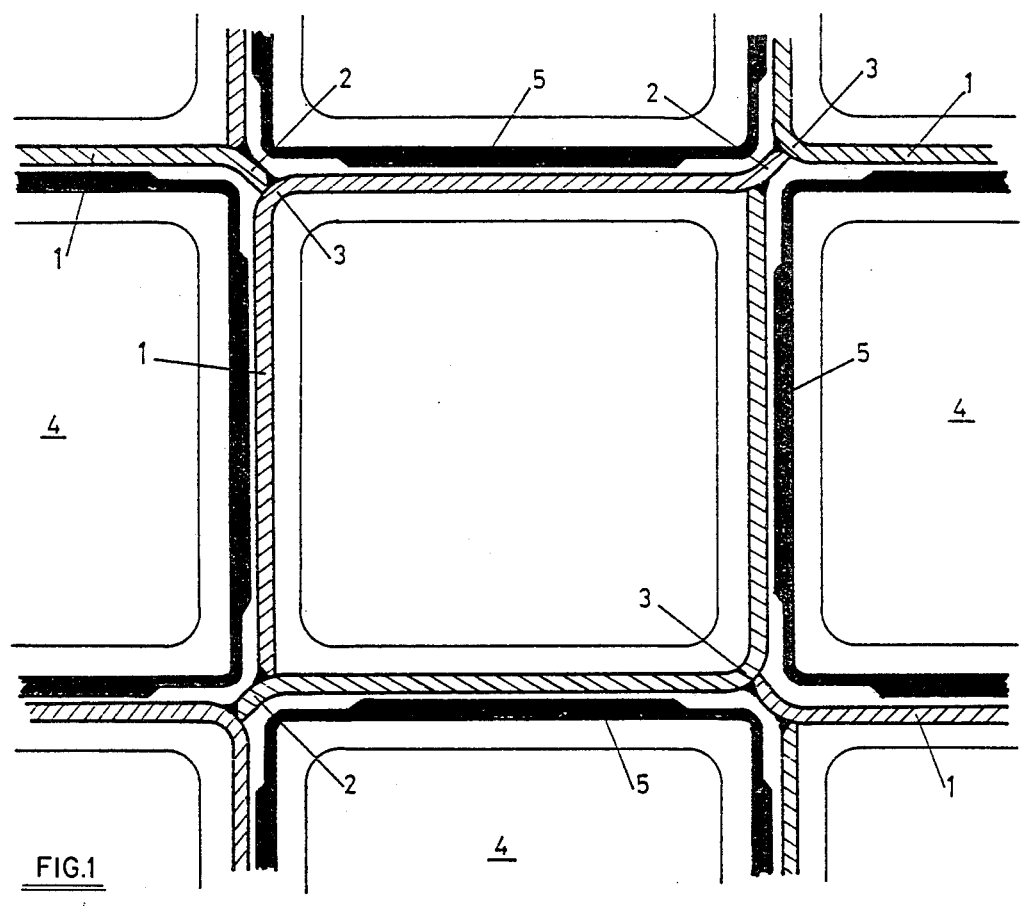
FIG. 1 is a partial horizontal section of a rack built according to the present invention.

As may be seen in FIGS. 1 through 7, the rack is comprised of a series of self-supporting metal tubes 1 arranged in a staggered fashion with respect to each other. In the example described, each of the tubes is comprised of two steel L angle sections joined longitudinally along their outer edges. Each such section is provided in one of its flanges with a projection 2 which, once the tubular element is formed, lies opposite the other so as to define a like number of skegs which, once the rack is assembled, lie opposite the edges 3 of the adjacent tubes lacking such skegs. By welding the skegs 2 to the edges 3, the elements are joined to each other in such a fashion that a tubular hole of larger cross-sectional area than the tubular elements 1 is defined between each four tubular elements. The covering of protective material 5 is placed within the tubular holes 4 defined between each four tubular elements, so that the internal cross-sectional area defined by the covering is equal to the internal cross-sectional area of the tubular elements 1.

With this construction, the spent radioactive fuel inserted into the tubular spaces 4 is protected by the protective covering 5. Similarly, the spent radioactive fuel stored in the tubular elements is protected by the protective coverings of the tubular holes surrounding each tubular element 1.

Figure 8:
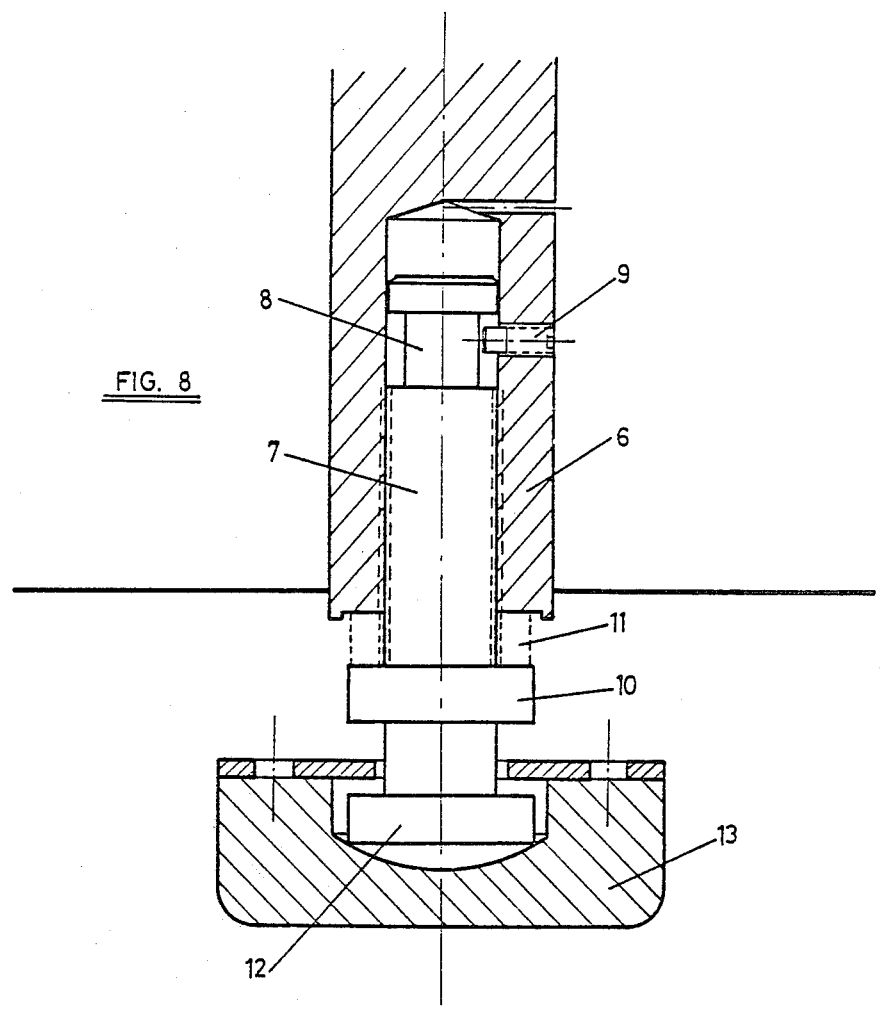
FIG. 8 is a vertical section of an elastic support for the base plate on which the tubular elements are mounted.
Figure 9:
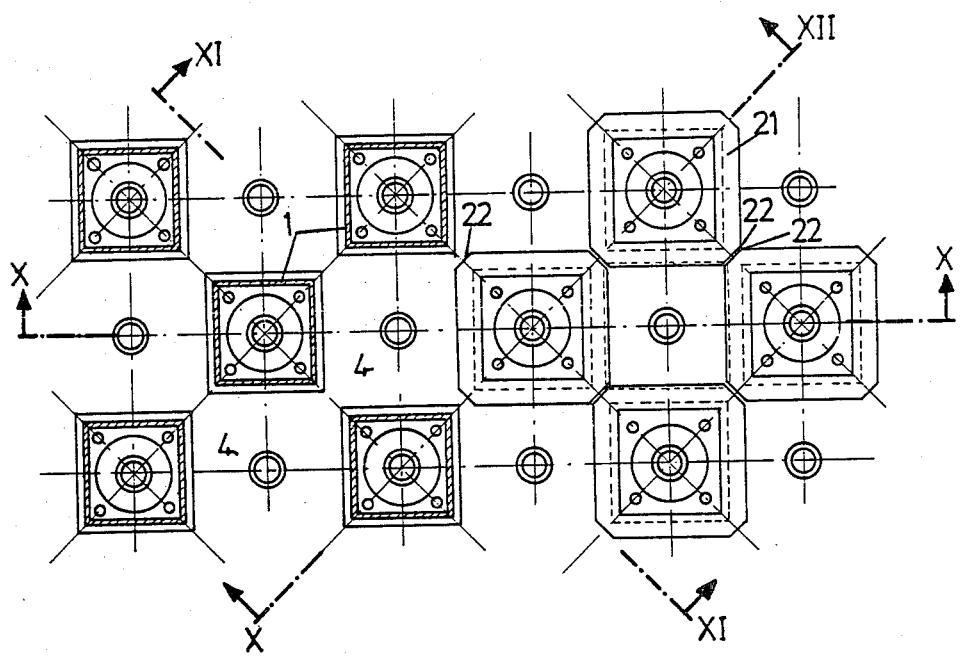
FIG. 9 is a partial top view of a rack built according to a second approach presented by the present invention.
Figure 12:
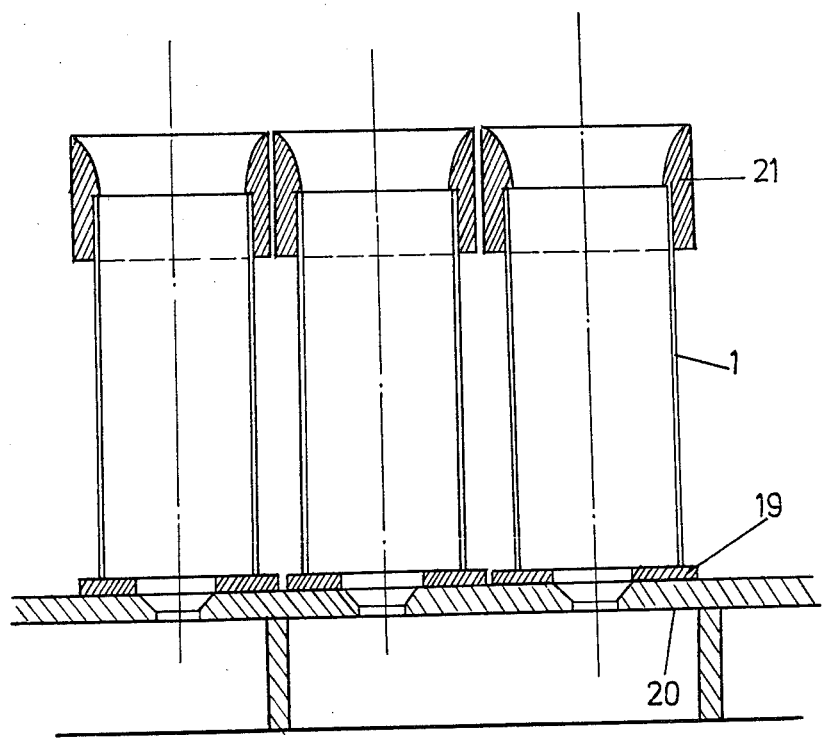
FIG. 12 is a section along line XII—XII of FIG. 9.

The tubular elements 1 are self-supporting and when joined in the fashion explained above constitute a rigid spatial structure which does not require stiffening elements, it being sufficient to connect them to a base plate or structure which may in turn be provided with supports of a construction such as the one shown in FIG. 8. The supports consist of a sleeve 6, which fits within a stem 7 capable of sliding axially a given distance. This distance is jointly determined by the length of its narrower portion 8 and by the radial screw 9, which acts as a stop for the surfaces delimiting said portion 8. The stem 7 is provided outside the sleeve 6 with a wider portion 10 between which and the sleeve 6 is mounted a compression spring 11 which constantly pushes the stem downward. Furthermore, the lower end of the sleeve 7 may be provided with a head 12 having a spherical lower surface, which head fits into a bushing 13 which rests on the surface upon which the container is placed. the housing of the bushing 13 and the head 12, having a spherical lower surface, define a hinge joint permitting the free orientation of the bushing 13. This possibility of orientation and the spring 11 are together capable of absorbing irregularities in the ground or surface upon which the container is located.

Figure 2:
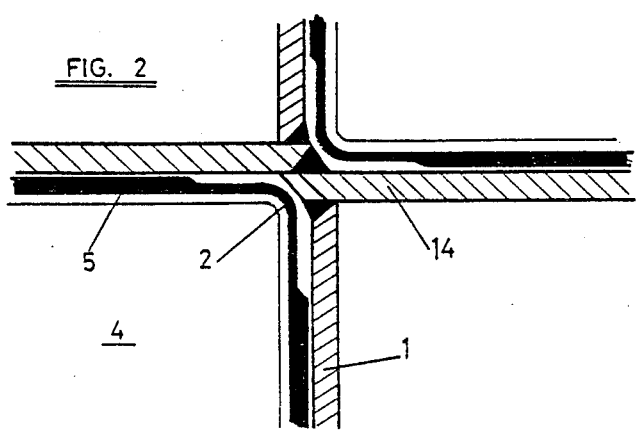

As shown in FIG. 2, the tubular elements 1 may consist of four duly welded plates, wherein one of the plates in each tubular element, referenced in the drawing with the number 14, is wider than the other three so as to define the projections 2 which are used for joining with the edges lacking such projections of the adjacent tubular elements.

As in the case of FIG. 1, a tubular hole 4 whose cross-sectional area is larger than that of the tubular elements 1 is defined between each four elements; the protective covering 5 being located within said tubular holes 4.

In the case of FIG. 3, the tubular elements 1 lack the longitudinal projections that define the skegs 2, said projections being obtained by welding along their longitudinal edges a longitudinal piece 15 at a 45° angle and arranged in such a fashion that the two pieces 15 of the adjacent edges of each two consecutive tubular elements lie opposite each other as shown in the drawing and are joined to each other by means of a bolt 16 or a rivet.

The two pieces 15 can be produced together with the tubular element 1 by extrusion, as is shown in FIG. 4, having the same orientation and being joined in the same fashion by means of bolts 16 or rivets.

In the case of FIG. 5, the tubular elements 1 may be comprised, as in the case of FIG. 2, by four plates welded to each other through parts 17 interposed at a 45° angle at their longitudinal corners and projecting outward so as to define the attachment skegs. The construction between the tubes may be effected, for example, by means of bolts 18 through tapped holes at a 45° angle of various places of the parts 17.

Figure 6:
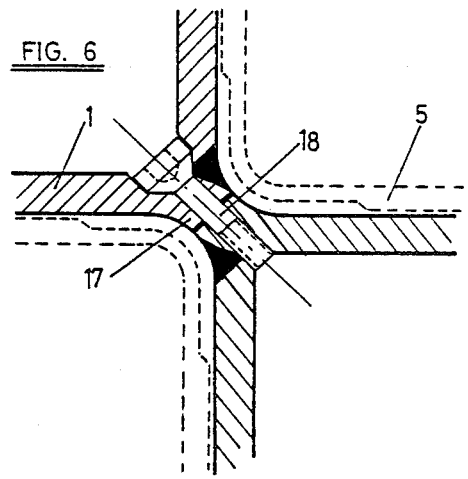
Figure 7:
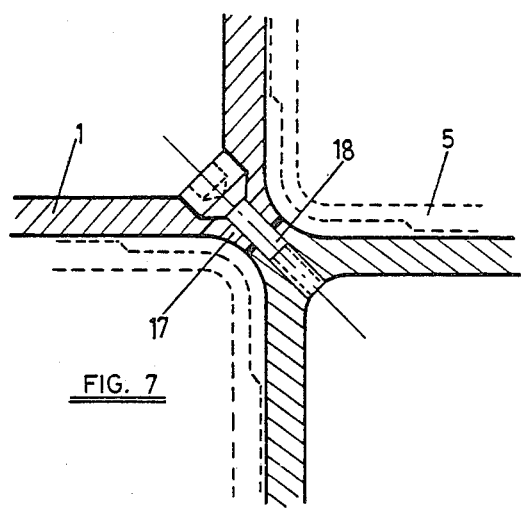

The same joining system is used in the case of FIGS. 6 and 7, with the difference that, in the case of FIG. 6, the projection 17 is part of one of the walls of the tubular element 1, and in the case of FIG. 7, the projections 17 are part of the entire tubular element 1 and are obtained, for example, by extrusion of said element.

In all cases, the protective covering 5 is located inside the tubular hole defined between each four tubular elements 1.

As can be seen, the construction of the tubular elements and the method of joining said elements to each other may be varied, provided no change is made in the essential characteristic of this construction, which is that the metal tubular elements 1 are self-supporting, that said tubular elements are arranged in a staggered fashion and are joined to each other along their longitudinal edges so as to form a rigid spatial structure, and that the protective covering is located only within the tubular holes defined by each four tubular elements 1.

With reference to the second embodiment, as may be seen in FIGS. 9 through 12, the rack is comprised as in the preceding case by a series of self-supporting tubular elements 1, arranged in a staggered fashion with respect to each other, so as to delimit between each four tubes, a tubular space or hole 4 wherein will be located the element 5 bearing the encapsulated neutron-absorbing material.

The tubular elements 1 may, for example, be welded to a bottom plate 19 which is in turn attached to a base plate 20 by means of, for example, bolts.

As in the preceding case, the tubular spaces or holes 4 delimited between each four tubular elements 1 have a larger horizontal cross-sectional area than said tubular holes, precisely in order to receive the element 5 bearing the encapsulated neutron-absorbing material which will constitute the protection for the spent radioactive fuel rods that will be housed both within the tubular elements 1, and within the tubular holes 4.

According to this invention, the tubular elements 1 are independent of each other throughout their length and each has a frame 21 attached to its upper end.

The frames of the various tubes may be independent, as shown in FIGS. 9 through 12, each frame 21 having four vertical surfaces or faces 22 in the area adjacent to the four surrounding frames. The faces 22 opposite the adjacent frames 21 are parallel to each other, there being a slight void or gap between them, as may be seen in FIG. 9, whose right side shows the tubular elements with the frames attached to them while the left side of the figure shows the tubular elements in cross-section.

The tubular elements 1 and the independent frames 21 together constitute a spatial structure of multiple elastic pillars capable of withstanding vibrations caused by, for example, earthquakes.

Figure 13:
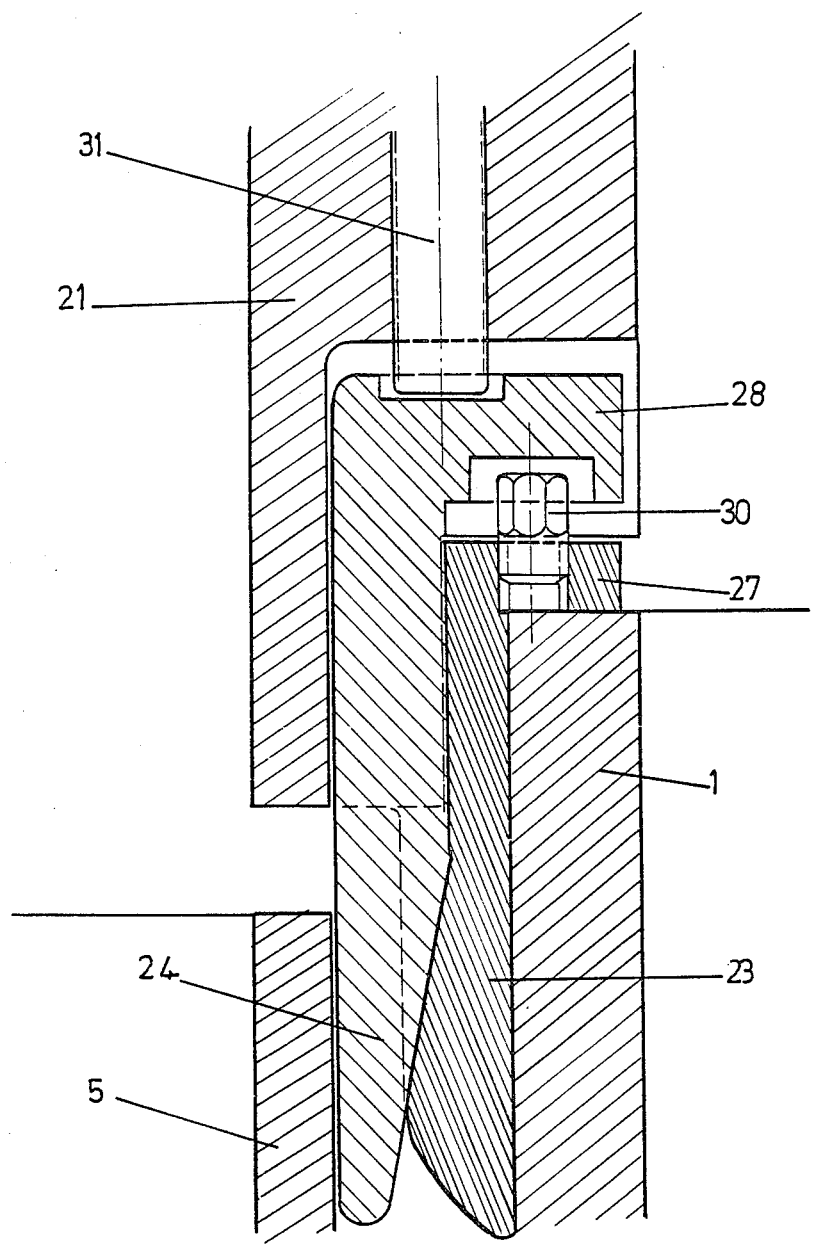
FIG. 13 is a vertical section, at a larger scale, of the upper portion of a tubular element, showing the frame and the adjustable devices for centering the element bearing the encapsulated neutron-absorbing material.

According to another aspect of the invention, depicted in FIG. 13, an adjustable device intended to center the element 5 bearing the encapsulated neutron-absorbing material and to eliminate the gap between the upper part of said element and the surrounding tubes is provided between each tubular element 1 and its upper frame 21.

Figure 14:
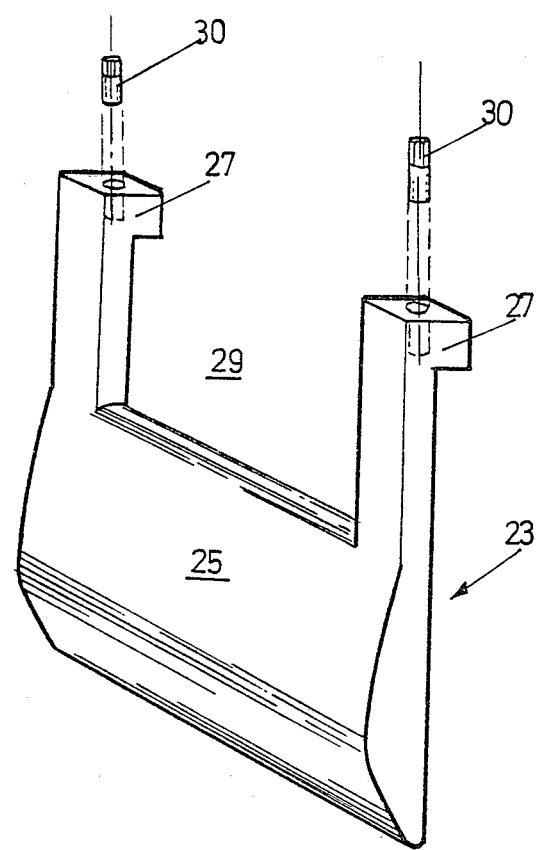
FIGS. 14 and 15 are perspective views of the parts that comprise the adjustable devices for centering the element bearing the encapsulated neutron-absorbing material.
Figure 15:
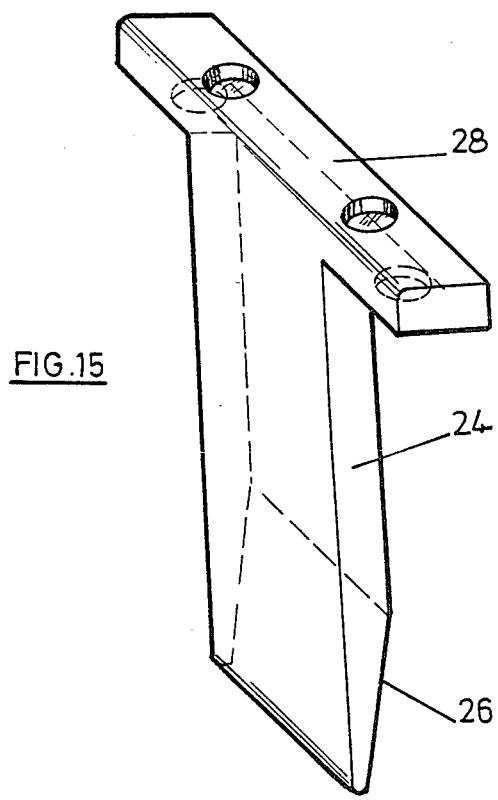

This adjustable device is comprised of two plates 23 and 24 which are respectively depicted in FIGS. 14 and 15.

These plates have surfaces, designated with the numbers 25 and 26, which face each other in a wedge-like fashion. The two plates are inserted back-to-back with respect to each other along the said surface between each tube 1 and the frame 5 of each element bearing the encapsulated neutron-absorbing material.

The two plates are provided at the top with an elbow, designated with the number 27 in plate 23, and 28 in plate 24, as can be best seen in FIGS. 14 and 15. In order to facilitate the mutual attachment of the plates, the top of plate 23 is provided outside the region corresponding to the wedge surface 25 with a cut-out portion 29 into which the portion of the plate 24 lying above its wedge surface 26 fits. As can be seen in FIG. 13, the elbows 27 and 28 face toward the tubular element 1 and provide mutual support between them and on the upper outer edge of said tube.

Adjustable support elements, consisting of bolts 30, making it possible to adjust the distance between the elbows 27 and 28, are arranged between the said elbows 27 and 28.

The frame 21 of each tube is also provided with stop elements consisting of vertical through bolts 31. These elements are threaded through the frame of each tube, starting at the upper surface thereof and extending downward beyond said frame, so as to rest on the elbow 28 of the plate on the side of the element bearing the encapsulated neutron-absorbing material. These bolts 31 limit the vertical movement of the plates 23 and 24.

Figure 16:
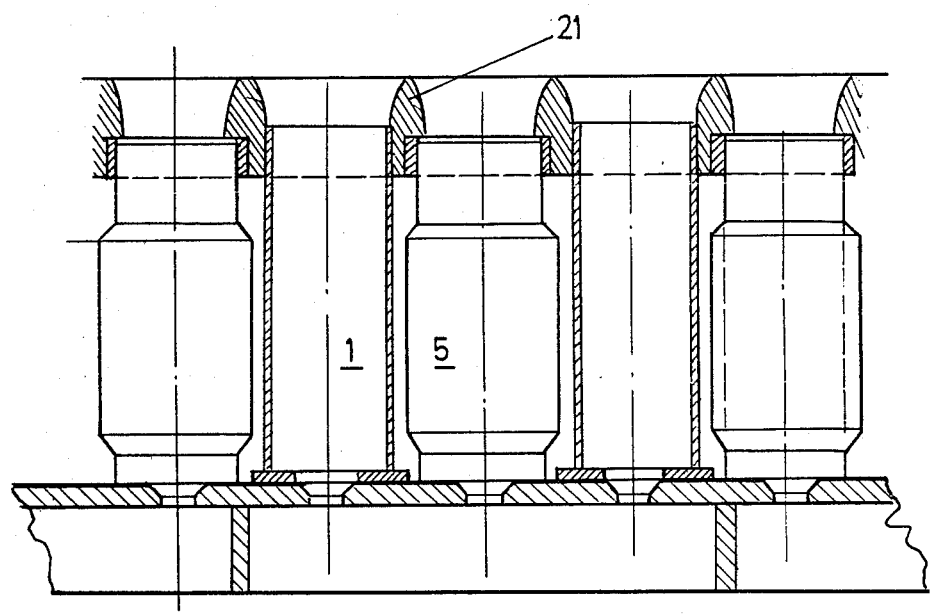
FIG. 16 is a section similar to FIG. 10, corresponding to a variant of that depicted in FIGS. 9 through 15.

According to the variant shown in FIG. 16, the frames 21 of the various tubes all comprise a single grid, so that the assembly of the tubes constitutes a spatial structure of multiple elastic bents.

The system used to eliminate the gap between element 5 and the surrounding tubes may be the same as described with reference to FIGS. 13 through 15.

In addition to the advantages derived from the construction discussed in the preceding embodiment, this construction achieves the further advantage that the rack is capable of withstanding the effects of earthquakes with low dynamic factors.

As has already been mentioned, holes may be provided in the walls of the metal tubular elements 1 in order to reduce the weight of the assembly even further.

Although only a preferred embodiment is specifically illustrated and described herein, it will be appreciated that many modifications and variations of the present invention are possible in light of the above teachings and within the purview of the appended claims without departing from the spirit and intended scope of the invention.

I claim:

1. A rack for storing spent radioactive fuel, of the type including a series of parallel cells with a protection consisting of neutron-absorbing material such as boron, which cells are attached to a base plate or structure, the assembly of cells being comprised of a plurality of self-supporting metal tubes arranged in a staggered fashion; the tubular hole delimited by each such four tubes having a larger cross-sectional area than that of each tube; the said tubular holes of larger cross-sectional area being intended to receive the protection of neutron-absorbing material; and said protection being independent of said tubes in order to permit its removal and later insertion into said holes.

2. A rack according to claim 1, wherein said metal tubes which define said cells are joined to each other along their longitudinal edges so as to form a rigid spatial structure.

3. A rack according to claim 1, wherein said tubes which define said cells are independent of each other throughout their length and each is fitted at its upper end with a frame between which and said tube there is provided in discrete areas adjustable devices for centering the element bearing the encapsulated neutron-absorbing material and eliminating the play between the upper portion of said element and the surrounding tubes, so that the assembly constitutes a spatial structure of multiple flexible pillars.

4. A rack according to claim 1, wherein said tubes are provided along at least two of their edges with a plurality of longitudinal external projections, the longitudinal outer edge of each of which is jointed to the closest edge of the adjacent tubes.

5. A rack according to claim 4, wherein the longitudinal outer edge of each of said projections is joined to the closest edges lacking such projections of the adjacent tubes.

6. A rack according to claim 4, wherein the longitudinal outer edges of the closest projections of adjacent tubes are joined to each other.

7. A rack according to claim 1, wherein each tube is provided along each of its four edges with an external longitudinal projection at an angle of approximately 45°, and the longitudinal outer edges of the closest projections of adjacent tubes are joined to each other.

8. A rack according to claim 3, wherein the frames of the various tubes are independent of each other; each frame is provided in the region adjacent to its four surrounding frames with a like number of vertical surfaces or faces; and the opposite faces of adjacent frames are parallel to each other and have a small gap or space between them.

9. A rack according to claim 3, wherein the frames of the various tubes all form part of a single grid extending throughout the tube assembly and form a spatial structure of multiple flexible bents.

10. A rack according to claim 3, wherein each of said adjustable devices comprises two plates which have surfaces, facing each other in a wedge-like fashion, said plates being inserted back-to-back with respect to each other between each tube and the frame of each element bearing the encapsulated neutron-absorbing material, wherein both plates are provided with an upper elbow on the side facing the tube to provide mutual support between them and adjustable support elements are provided on the outer edge of said tube between said elbows, so as to permit adjusting the distance between said elbows; the frame of each tube also being provided with top elements to limit the vertical displacement of the plates.

11. A rack according to claim 10, wherein said support elements consist of vertical through bolts threaded in the elbow of the plate located on the tube side, upon which bolts the elbow of the other plate rests.

12. A rack according to claim 10, wherein said stop elements consist of vertical through bolts threaded through the frame of each tube starting on the upper surface thereof, and extending downward beyond said frame, so as to rest on the elbow of the plate located on the side of the element bearing the encapsulated neutron-absorbing material.

13. A rack according to claims 1, 2 or 3, wherein the walls of said tubes are provided with holes intended to reduce the weight of said tubes.

14. A rack according to claims 1, 2 or 3, further including adjustable supports upon which the container rests, wherein at least some of the said supports are provided with metal springs and are capable of absorbing irregularities in the ground.

* * * * *